(12) United States Patent
Abdella et al.

(10) Patent No.: US 12,337,738 B2
(45) Date of Patent: Jun. 24, 2025

(54) FLUID SYSTEM FOR A VEHICLE SEAT ASSEMBLY

(71) Applicant: Lear Corporation, Southfield, MI (US)

(72) Inventors: David Abdella, Royal Oak, MI (US); Joshua Hallock, Warren, MI (US); Grzegorz Kasperczyk, Warsaw (PL); Ian Fletcher, Milford, MI (US); Samuel Blair, Troy, MI (US)

(73) Assignee: Lear Corporation, Southfield, MI (US)

( * ) Notice: Subject to any disclaimer, the term of this patent is extended or adjusted under 35 U.S.C. 154(b) by 315 days.

(21) Appl. No.: 17/983,881

(22) Filed: Nov. 9, 2022

(65) Prior Publication Data

US 2024/0149766 A1 May 9, 2024

(51) Int. Cl.
| | | |
|---|---|---|
| *B60N 2/66* | (2006.01) | |
| *B60N 2/64* | (2006.01) | |
| *A47C 27/08* | (2006.01) | |
| *B60C 29/00* | (2006.01) | |
| *B60N 2/90* | (2018.01) | |
| *B60R 21/207* | (2006.01) | |

(52) U.S. Cl.
CPC .............. *B60N 2/665* (2015.04); *B60N 2/646* (2013.01); *A47C 27/081* (2013.01); *B60C 29/00* (2013.01); *B60N 2/914* (2018.02); *B60R 21/207* (2013.01)

(58) Field of Classification Search
CPC ........ B60N 2/665; B60N 2/914; B60N 2/976; B60N 2/7082; B60N 2/708852; B60N 2/1878; B60N 2210/44; B60R 21/207; B60R 21/2334; A47C 27/081; A47C 7/142; B60C 29/00
See application file for complete search history.

(56) References Cited

U.S. PATENT DOCUMENTS

| | | | |
|---|---|---|---|
| RE30,491 E | | 1/1981 | Gomez |
| 4,621,383 A | * | 11/1986 | Gendala .............. A47C 27/084 5/655.3 |
| 4,865,383 A | | 9/1989 | Sbaragli et al. |

(Continued)

FOREIGN PATENT DOCUMENTS

| | | |
|---|---|---|
| CN | 109689428 A | 4/2019 |
| CN | 213322780 U | 6/2021 |

(Continued)

OTHER PUBLICATIONS

Barker, "BMW's Heated Seats as a Service Model Has Drivers Seeking Hacks", https://www.wired.com/story/bmw-heated-seats-as-a-service-model-has-drivers-seeking-hacks, Jul. 24, 2022, 13 pages.

(Continued)

*Primary Examiner* — Syed A Islam

(74) *Attorney, Agent, or Firm* — Carlson, Gaskey & Olds, P.C.

(57) ABSTRACT

An assembly is provided with a first layer connected to a second layer to form a bladder, with the first layer defining a first aperture therethrough, and one of the first or second layers defining a second aperture therethough. The third layer is connected to the first layer and positioned between the first and second layers within the bladder. The third layer is movable between a first position covering the first aperture, and a second position spaced apart from the first aperture. A seat assembly is also provided.

20 Claims, 4 Drawing Sheets

(56) References Cited

U.S. PATENT DOCUMENTS

| | | | |
|---|---|---|---|
| 5,092,316 A | 3/1992 | Taylor et al. | |
| 5,294,085 A | 3/1994 | Lloyd et al. | |
| 5,551,755 A | 9/1996 | Lindberg | |
| 5,590,428 A * | 1/1997 | Roter | A47C 27/081 |
| | | | 297/180.13 |
| 5,658,046 A | 8/1997 | Rus | |
| 5,658,050 A | 8/1997 | Lorbiecki | |
| 5,711,575 A | 1/1998 | Hand et al. | |
| 5,811,186 A | 9/1998 | Martin et al. | |
| 5,971,478 A | 10/1999 | Hurite | |
| 5,975,629 A | 11/1999 | Lorbiecki | |
| 6,129,419 A | 10/2000 | Neale | |
| 6,273,810 B1 | 8/2001 | Rhodes, Jr. et al. | |
| 6,869,140 B2 | 3/2005 | White et al. | |
| 6,893,086 B2 | 5/2005 | Bajic et al. | |
| 7,040,710 B2 | 5/2006 | White et al. | |
| 7,052,091 B2 | 5/2006 | Bajic et al. | |
| 7,197,801 B2 | 4/2007 | Bajic et al. | |
| 7,229,129 B2 | 6/2007 | White et al. | |
| 7,434,282 B2 | 10/2008 | Fraser et al. | |
| 7,478,869 B2 | 1/2009 | Lazanja et al. | |
| 7,637,573 B2 | 12/2009 | Bajic et al. | |
| 7,735,932 B2 | 6/2010 | Lazanja et al. | |
| 7,775,602 B2 | 8/2010 | Lazanja et al. | |
| 7,874,616 B2 | 1/2011 | D'Agostini | |
| 7,892,991 B2 | 2/2011 | Yamanaka et al. | |
| 7,946,649 B2 | 5/2011 | Galbreath et al. | |
| 7,971,931 B2 | 7/2011 | Lazanja et al. | |
| 8,038,222 B2 | 10/2011 | Lein et al. | |
| 8,162,391 B2 | 4/2012 | Lazanja et al. | |
| 8,162,398 B2 | 4/2012 | Colja et al. | |
| 8,360,517 B2 | 1/2013 | Lazanja et al. | |
| 8,641,142 B2 * | 2/2014 | Griffin | G01G 19/4142 |
| | | | 297/217.3 |
| 8,662,583 B2 | 3/2014 | Guadagno | |
| 8,777,320 B2 | 7/2014 | Stoll et al. | |
| 8,814,267 B2 | 8/2014 | Welch, Sr. et al. | |
| 9,080,581 B2 | 7/2015 | Bocsanyi et al. | |
| 9,266,455 B2 | 2/2016 | Uramichi et al. | |
| 9,278,633 B2 | 3/2016 | Brncick et al. | |
| 9,440,567 B2 | 9/2016 | Lazanja et al. | |
| 9,561,744 B2 | 2/2017 | Galbreath et al. | |
| 9,615,670 B2 | 4/2017 | Takaoka | |
| 9,751,442 B2 | 9/2017 | Smith | |
| 9,862,244 B2 | 1/2018 | Kim et al. | |
| 9,938,649 B2 | 4/2018 | Taninaka et al. | |
| 9,945,490 B2 | 4/2018 | Dankbaar et al. | |
| 9,970,140 B2 | 5/2018 | Taninaka et al. | |
| 9,970,564 B2 | 5/2018 | Dankbaar et al. | |
| 10,065,543 B2 | 9/2018 | Persson et al. | |
| 10,107,410 B2 | 10/2018 | Dankbaar et al. | |
| 10,160,356 B2 | 12/2018 | Lofy et al. | |
| 10,207,619 B2 | 2/2019 | Dankbaar et al. | |
| 10,214,129 B2 | 2/2019 | Jaranson et al. | |
| 10,384,574 B2 | 8/2019 | Fang | |
| 10,414,303 B2 | 9/2019 | Fujikake et al. | |
| 10,518,738 B2 * | 12/2019 | Kobayashi | B60R 21/239 |
| 10,625,643 B2 | 4/2020 | Iacovone et al. | |
| 10,676,000 B2 | 6/2020 | Galbreath et al. | |
| 10,696,202 B2 | 6/2020 | Sedenka | |
| 10,710,480 B2 | 7/2020 | Iacovone et al. | |
| 10,752,145 B2 | 8/2020 | Steinberger et al. | |
| 10,773,615 B2 | 9/2020 | McElroy et al. | |
| 10,786,162 B2 | 9/2020 | Benson et al. | |
| 10,793,041 B2 | 10/2020 | Steinberger et al. | |
| 10,856,664 B2 | 12/2020 | Bhatia et al. | |
| 10,899,262 B2 | 1/2021 | Wheeler | |
| 11,014,478 B2 | 5/2021 | Benthaus et al. | |
| 11,065,991 B2 | 7/2021 | Iacovone et al. | |
| 11,091,072 B2 | 8/2021 | Greenwood et al. | |
| 11,148,563 B2 * | 10/2021 | Masuda | B60R 21/207 |
| 11,247,529 B2 | 2/2022 | Zhou et al. | |
| 11,358,553 B1 * | 6/2022 | Kurematsu | B60R 21/207 |
| 11,712,985 B2 * | 8/2023 | Ogiso | B60N 2/665 |
| | | | 297/284.6 |
| 12,036,163 B2 * | 7/2024 | Arenas | A61G 7/05769 |
| 2002/0096931 A1 | 7/2002 | White et al. | |
| 2003/0038517 A1 | 2/2003 | Moran et al. | |
| 2003/0075960 A1 | 4/2003 | Wilkerson et al. | |
| 2004/0004376 A1 | 1/2004 | Cabebe | |
| 2005/0066423 A1 | 3/2005 | Hogan | |
| 2006/0208540 A1 | 9/2006 | Lofy et al. | |
| 2006/0217644 A1 | 9/2006 | Ozaki et al. | |
| 2007/0035165 A1 | 2/2007 | Zahel | |
| 2010/0207443 A1 | 8/2010 | Brncick | |
| 2012/0299360 A1 | 11/2012 | Welch, Sr. et al. | |
| 2013/0097777 A1 | 4/2013 | Marquette et al. | |
| 2013/0187419 A1 | 7/2013 | Worlitz et al. | |
| 2015/0069811 A1 | 3/2015 | Sachs et al. | |
| 2015/0165940 A1 | 6/2015 | Schnell et al. | |
| 2016/0200228 A1 | 7/2016 | Saren et al. | |
| 2017/0043681 A1 | 2/2017 | Seiller et al. | |
| 2017/0266070 A1 | 9/2017 | Bobey et al. | |
| 2017/0283071 A1 | 10/2017 | Velasco | |
| 2018/0008507 A1 | 1/2018 | Sarén et al. | |
| 2018/0009343 A1 | 1/2018 | Saren et al. | |
| 2018/0036198 A1 | 2/2018 | Mergl et al. | |
| 2018/0361892 A1 | 12/2018 | Iacovone et al. | |
| 2018/0361897 A1 | 12/2018 | Lem et al. | |
| 2019/0143856 A1 | 5/2019 | O'Hara et al. | |
| 2020/0108752 A1 | 4/2020 | Morishita et al. | |
| 2020/0215765 A1 | 7/2020 | Murmann et al. | |
| 2021/0024155 A1 | 1/2021 | Primeaux et al. | |
| 2021/0115607 A1 | 4/2021 | Inoue et al. | |
| 2021/0339662 A1 | 11/2021 | Iacovone et al. | |
| 2021/0354401 A1 | 11/2021 | Kurematsu et al. | |
| 2022/0080868 A1 | 3/2022 | Kalmutzki et al. | |
| 2022/0236131 A1 | 7/2022 | Clemente et al. | |
| 2022/0274516 A1 | 9/2022 | Withey | |
| 2022/0314851 A1 | 10/2022 | Pereny et al. | |
| 2022/0314854 A1 | 10/2022 | Pereny et al. | |

FOREIGN PATENT DOCUMENTS

| | | |
|---|---|---|
| CN | 113459913 A | 10/2021 |
| CN | 112622722 B | 3/2023 |
| DE | 10056235 A1 | 5/2002 |
| DE | 10116696 C1 | 9/2002 |
| DE | 10353596 A1 | 6/2005 |
| DE | 102011122124 A1 | 7/2012 |
| DE | 102014001678 B3 | 7/2014 |
| DE | 102014201663 B4 | 8/2016 |
| DE | 112017004243 T5 | 5/2019 |
| DE | 102018101450 A1 | 7/2019 |
| DE | 102019206830 A1 | 11/2020 |
| DE | 102019219675 A1 | 6/2021 |
| DE | 102017221150 B4 | 7/2021 |
| DE | 202021103121 U1 | 6/2022 |
| DE | 102019214576 B4 | 5/2023 |
| EP | 2230126 A2 | 9/2010 |
| EP | 3037703 A1 | 6/2016 |
| EP | 2423040 B1 | 10/2017 |
| EP | B281821 B1 | 4/2019 |
| FR | 2692477 A1 | 12/1993 |
| FR | 2771271 A1 | 5/1999 |
| FR | 3036336 B1 | 6/2017 |
| JP | 10000922 A2 | 1/1998 |
| JP | 2000004993 A | 1/2000 |
| JP | 2012115515 A | 6/2012 |
| JP | 2018149799 A | 9/2018 |
| JP | 2021074092 A | 5/2021 |
| KR | 20140005569 U | 10/2014 |
| KR | 101880763 B1 | 7/2018 |
| KR | 102228215 B1 | 3/2021 |
| WO | 2004026623 A1 | 4/2004 |
| WO | 2015039701 A1 | 3/2015 |
| WO | 2017025404 A1 | 2/2017 |
| WO | 2018039472 A1 | 3/2018 |
| WO | 2019079027 A1 | 4/2019 |
| WO | 2020257925 A1 | 12/2020 |
| WO | 2022051047 A1 | 3/2022 |
| WO | 2022069934 A1 | 4/2022 |

(56) References Cited

FOREIGN PATENT DOCUMENTS

OTHER PUBLICATIONS https://www.tesplus.com/model-3-seat-massage-module.html, "Massage Module for Model 3/Y", 2022, 6 pages.
Youtube, "The Sterling Coilmaster Jr. TS Plastic Spiral Binding Machine", https://www.youtube.com/watch?v=8iariyFJRjY, Mar. 21, 2017, 2 pages.
International Search Report and Written Opinion for Application No. PCT/US23/25365, dated Sep. 19, 2023, 18 pages.
International Search Report and Written Opinion for Application No. PCT/US23/25473, dated Oct. 11, 2023, 11 pages.
International Search Report and Written Opinion for Application No. PCT/US2023/025395, dated Oct. 16, 2023, 20 pages.
Invitation to Pay Additional Fees for Application No. PCT/US2023/025395, dated Aug. 2, 2023, 3 pages.
Invitation to Pay Additional Fees for Application No. PCT/US23/25483, dated Aug. 14, 2023, 3 pages.
Invitation to Pay Additional Fees for Application No. PCT/US2023/025413, dated Aug. 2, 2023, 3 pages.

* cited by examiner

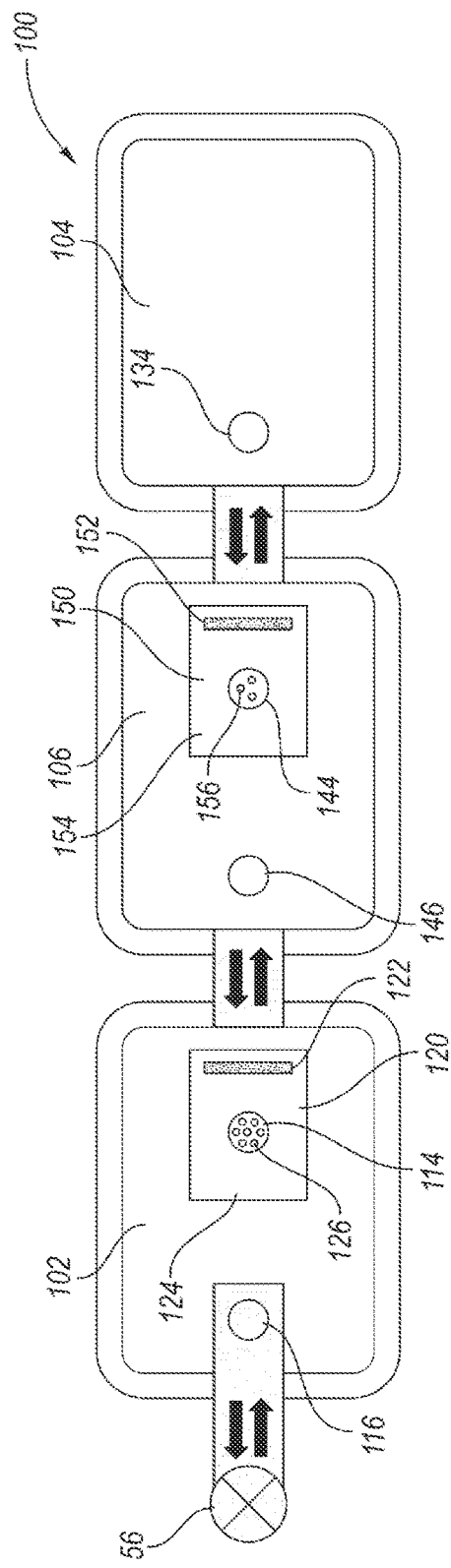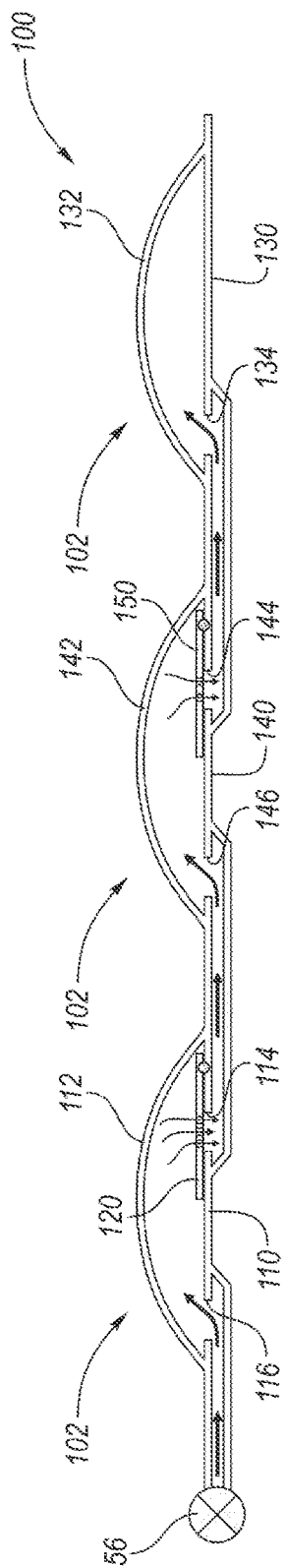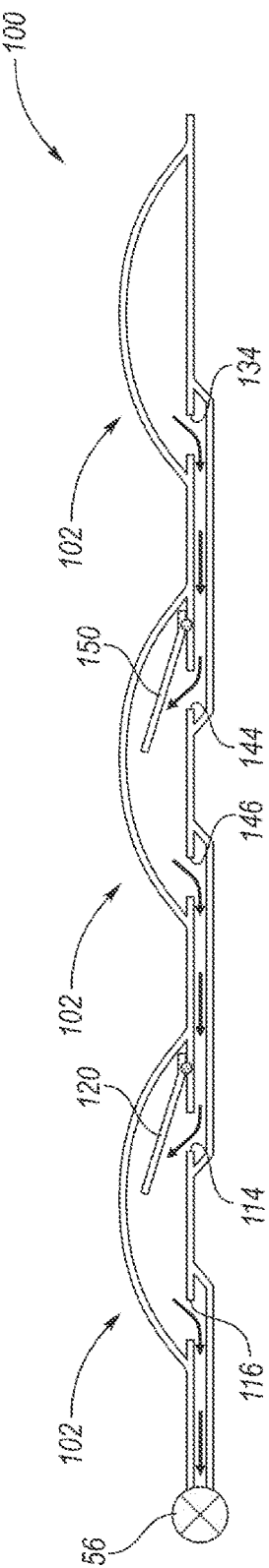

FLUID SYSTEM FOR A VEHICLE SEAT ASSEMBLY

TECHNICAL FIELD

Various embodiments relate to a bladder assembly and a fluid system for a seat assembly.

BRIEF DESCRIPTION OF THE DRAWINGS

FIG. 2 illustrates a top view of a bladder assembly according to an embodiment and for use with the vehicle seat assembly of FIG. 1;

FIG. 3 illustrates a side schematic view of the bladder assembly of FIG. 2 during inflation;

FIG. 4 illustrates a side schematic view of the bladder assembly of FIG. 2 during deflation;

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification specify the presence of stated features, integers, steps, operations, elements, and/or components, but do not preclude the presence or addition of one or more other features, integers, steps, operations, elements, components, and/or groups thereof.

Figure 1:
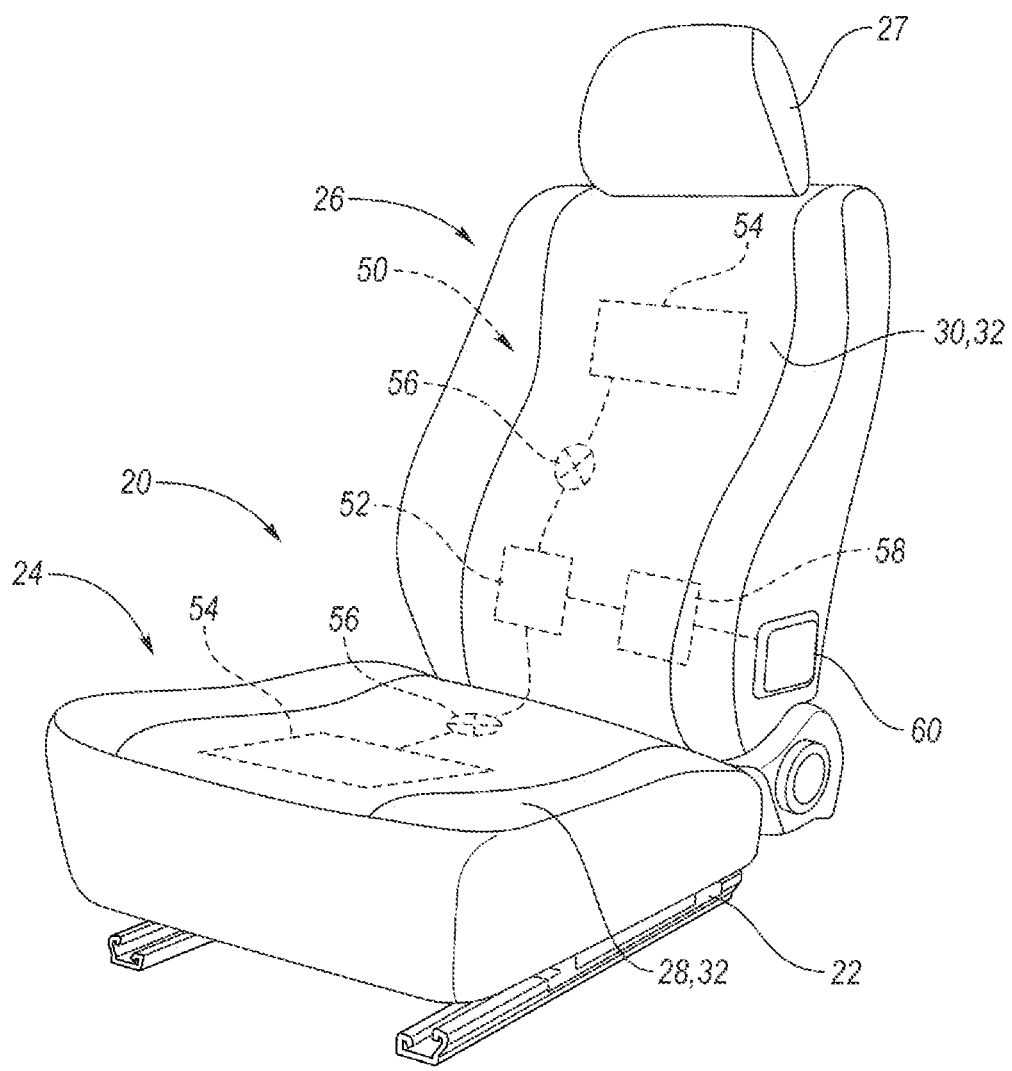
FIG. 1 illustrates a perspective schematic view of a seat assembly according to an embodiment.

Referring to FIG. 1, a seat assembly 20, such as a vehicle seat assembly 20 is illustrated. In other examples, the seat assembly 20 may be shaped and sized as a front row driver or passenger seat, a second, third, or other rear row seat, and may include bench-style seats as shown, bucket seats, or other seat styles. Furthermore, the seat assembly may be a non-stowable seat or a stowable seat that may be foldable and stowable in a cavity in the vehicle floor. Additionally, the seat assembly 20 may be configured for use with other non-vehicle applications.

The seat assembly 20 has a support structure 22 that may be provided by one or more support members. A support member may be provided by a frame and/or a substrate. The seat assembly has seat components, and these seat components include at least a seat bottom 24 and a seat back 26. The seat bottom 24 may be sized to receive a seated occupant to support a pelvis and thighs of the occupant. The seat back 26 may be sized to extend upright from the seat bottom 24 to support a back of the occupant. The seat assembly may additionally have a head restraint 27. The seat bottom 24 has a seat bottom cushion 28. The seat back 26 has a seat back cushion 30. The support structure 22 provides rigid structural support for the seat components, e.g. the seat bottom 24 and seat back 26, and the associated cushions 28, 30. One or more trim assemblies 32 are used to cover the seat bottom cushion 28 and/or the seat back cushion 30, and provide a seating surface for the seat assembly 20.

The seat assembly 20 has one or more fluid systems 50, such as an air system. Although only one fluid system 50 is shown, it is also contemplated that the seat assembly 20 may have two or more fluid systems 50. The fluid system 50 has a fluid transfer device 52 to provide pressurized fluid flow or air flow to one or more bladder assemblies 54 in the seat assembly 20. The fluid transfer device 52 may be a fan, air pump, compressor, blower, pump, or the like to provide flow of a fluid. The seat assembly 20 is shown with two bladder assemblies; however the seat assembly 20 may have only one bladder assembly or more than two bladder assemblies.

The fluid system 50 may provide a massage function, for example via bladders positioned within the seating component(s); a lumbar control function with one or more bladders positioned within the seating component(s); or other seat position controls with bladders appropriately positioned in the seating component(s), e.g. to control the angle or tilt of cushion and associated support pan of the seat component relative to its associated frame 22. In other examples, the fluid system 50 may be used for other seat functions and/or features as are known in the art. The fluid system 50 may provide fluid flow to one or more of the bladder assemblies 54 for static inflation where the bladder holds its position at a selected inflation level, e.g. for lumbar or seat position functions, or may provide fluid flow to one or more of the bladder assemblies 54 for dynamic inflation where the bladder inflation or position changes, e.g. for massage functions. In further examples, the seat assembly 20 may be provided with only a single fluid system, or with more than two fluid systems.

The fluid system 50 may have various valve assemblies 56 and other components. Valve assemblies 56 in the fluid system 50 according to various embodiments are described in further detail below, and may be used to control fluid flow from the fluid transfer device 52 to one or more of the bladder assemblies 54, as well as to control return flow or venting of the bladder assemblies 54.

The valve assemblies 56 and the fluid transfer device 52 may each be in communication with a controller 58 for control of the operation of the fluid system 50, and the inflation or deflation of the bladder assemblies 54. The controller 58 may further be in communication with a user input 60 to allow a seat occupant to control operation of the fluid system, or to select various functions, e.g. massage, massage speed, lumbar level, seat position angle, or the like.

FIGS. 2-4 illustrate a bladder assembly 100 according to an embodiment. In various examples, the bladder assembly 100 may be used with the seat assembly 20 of FIG. 1, and as the bladder assembly 54 in a fluid system 50.

The bladder assembly 100 is shown with a first bladder 102, a third bladder 106, and a second bladder 104, and in sequential fluid arrangement. In other examples, the bladder assembly 100 may be provided with one or two bladders, or with more than three bladders. Furthermore, the bladders 102, 104, 106 may be arranged in other flow configurations, e.g. for parallel fluid flow, or for a combination of sequential and parallel fluid flow, e.g. with the third 106 bladder replaced by two or more bladders in parallel arrangement with one another and sequentially positioned between the first and second bladders.

The bladder assembly 100 is fluidly connected to the fluid transfer device 52 via a valve assembly 56. In one example, all of the flow into or out of the bladder assembly 100 passes through the valve assembly 56.

The first bladder 102 has a first layer 110 connected to a second layer 112 to form a bladder and to define a cavity between the first and second layers. The first layer 110 defines a first aperture 114 therethrough. One of the first or second layers defines a second aperture 116 therethough. In the example shown, the first layer 110 also defines the second aperture 116. The first and second apertures 114, 116 are both in fluid communication with the cavity of the first bladder 102. The second aperture 116 may be provided without a flap valve as shown, e.g. may be provided as an open, unobstructed, or unrestricted aperture.

The first bladder has a third layer 120 connected to the first layer 110 and positioned between the first and second layers 110, 112 within the bladder and within the cavity. In the example shown, the third layer 120 is connected to the first layer 110 along a proximal end 122, and extends to a distal free end 124. The third layer 120 provides a valve element for the first bladder, and may be configured as a flap valve. The third layer 120 is movable between a first position covering the first aperture 114 to act as a closed valve element and prevent, limit, or restrict fluid flow through the first aperture 114 as shown in FIG. 3, and a second position spaced apart from the first aperture 114 to act as an open valve element and permit fluid flow through the first aperture as shown in FIG. 4.

According to the example shown, the third layer 120 has one or more perforations 126 therethrough, with the perforations 126 overlapping the first aperture 114 when the third layer 120 is in the first, closed position. In one example, the perforations 126 are provided as a single perforation, and in other examples, may be provided as a series or multiple perforations. The perforations 126 have a collective cross-sectional area that is less than the cross-sectional area of the first aperture 114, such that fluid flow (e.g. flow rate) through the first aperture 114 with the third layer 120 in the first, closed position is less than flow through the first aperture 114 with the third layer 120 in the second, open position. The perforations 126 may be provided as a circular hole, or as a slot or other shape.

The second bladder 104 has a fourth layer 130 connected to a fifth layer 132 to form a bladder and to define a cavity between the fourth and fifth layers 130, 132. The fourth layer 130 defines a third aperture 134 therethrough. The third aperture 134 is in fluid communication with the cavity of the second bladder 104. The fourth and fifth layers 130, 132 of the second bladder may be the same as the first and second layers of the first bladder, e.g. formed from the same layers or panels, or may be provided as separate panels or layers. In one example and as shown, the third aperture 134 of the second bladder is the sole aperture in the second bladder. In a further example, the third aperture 134 may be provided without a flap valve or is provided as an open, unobstructed, or unrestricted aperture.

The third aperture 134 of the second bladder is fluidly connected to the first bladder 102. The second bladder 104 receives fluid flow into it from the first aperture 114 of the first bladder.

The third bladder 106 of the bladder assembly 100 has a sixth layer 140 connected to a seventh layer 142 to define a cavity therebetween. The sixth layer 140 defines a fourth aperture 144, and the sixth or the seventh layer defines a fifth aperture 146 therethrough. In the example shown, the sixth layer 140 also defines the fifth aperture 146. The fifth aperture 146 may be provided similarly to aperture 116 as described above. The third bladder 106 has an eighth layer 150 that is positioned between the sixth and seventh layers 140, 142 within the cavity. The eighth layer 150 may be similar to that described above with respect to the third layer 120, and extend from a proximal end 152 connected to the layer 140 to a distal free end 154. The eighth layer 150 is movable from a first position covering the fourth aperture 144 as shown in FIG. 3 and a second position spaced apart from the fourth aperture 144 as shown in FIG. 4.

According to the example shown, the eighth layer 150 has one or more perforations 156 therethrough, with the perforations 156 overlapping the fourth aperture 144 when the eighth layer 150 is in the first, closed position. In one example, the perforations 156 are provided as a single perforation, and in other examples, may be provided as a series or multiple perforations. The perforations 156 have a collective cross-sectional area that is less than the cross-sectional area of the fourth aperture 144, such that fluid flow (e.g. flow rate) through the fourth aperture 144 with the eighth layer 150 in the first, closed position is less than flow through the fourth aperture 144 with the eighth layer 150 in the second, open position. The collective cross-sectional area of the perforations 156 in the eighth layer may be less than the collective cross-sectional area of the perforations 126 in the third layer. In other examples, the collective cross-sectional area of the perforations 156 in the eighth layer may be greater than or equivalent to the collective cross-sectional area of the perforations 126 in the third layer The third bladder 106 is positioned between and fluidly connects the first bladder 102 to the second bladder 104. The third bladder 106 is fluidly connected to the first bladder 102 via the first aperture 114 of the first bladder and the fifth aperture 146 of the third bladder. The second bladder 104 is fluidly connected to the third bladder 106 via the fourth aperture 144 of the third bladder and the third aperture 134 of the second bladder.

In various examples, the layers of the bladder assembly 100, including the first, second, and/or third layers of the first bladder 102, and layers of the other bladders 104, 106 are formed from a thermoplastic material. In other examples, one or more of the layers in the bladders 102, 104, 106 of the bladder assembly 100 may be formed from a thermoplastic polyurethane (TPU), another thermoplastic, or other materials such as rubber or latex.

The fourth and fifth layers 130, 132 of the second bladder may be the same as the first and second layers 110, 112 of the first bladder, e.g. formed from the same layers or panels, or may be provided as separate panels or layers. The sixth and seventh layers 140, 142 of the third bladder may likewise be the same as the first and second layers 110, 112 of the first bladder and/or the third and fourth layers 130, 132 of the second bladder, or may be provided as separate panels or layers. In other examples, the first and second layers 110, 112 of the first bladder may be formed form a single sheet or panel that is folded to form both of the first and second layers. The second and third bladders 104, 106 may likewise be formed. Additionally, layers of the bladders may at least partially form the connecting channels or passages between adjacent bladders, as shown. Additionally layers may be provided for the connecting channels or passage, or other tubing or flow connections may be provided between the bladders. The various layers of each of the bladders may be connected via adhesive, welding, bonding, or another technique as is known in the art. Note that welding may include a process for thermoplastics including heat and/or pressure, ultrasonic joining, or the like. The various layers of each of the bladders may be connected around an outer perimeter region to form the bladder and cavity.

The first bladder 102 is in fluid communication with the pump or fluid transfer device via the second aperture 116 and the valve assembly 56. The controller 58 is configured to control the valve 56 between an open position and a closed position, wherein the first bladder 102 inflates with the valve 56 in the open position and the pump operating. The controller operates the pump and opens the valve to inflate the bladder assembly 100. In one example, the bladder assembly 100 is inflated by the pump to modify an orientation of seating surface of the seat member. In other examples, the bladder assembly 100 is inflated by the pump to provide a massage effect to a seat occupant.

In one example, the bladder assembly 100 provides a sequential pneumatic massage effect for the seat assembly, and is operated passively, e.g. sequential inflation and deflation of the bladders of the assembly 100 occur based on the structure and connections between the bladders, and not due to active control of any valves interconnecting the individual bladders. The first bladder therefore inflates faster than the third bladder 106, which in turn, inflates faster than the second bladder 104. The first bladder 102 may reach a fully inflated state before the third bladder 106, and likewise, the third bladder 106 may reach a fully inflated state before the second bladder 104.

A schematic of the bladder assembly with flow for inflation is shown in FIG. 3. A schematic of the bladder assembly with flow for deflation is shown in FIG. 4. Once the valve 56 is opened, the first bladder 102 begins to fill or inflate. Flow continues through the first bladder 102 and to the third bladder 106, but is restricted by the perforations 126 in the third layer 120 in the closed position. The third bladder 106 therefore also begins to inflate, but at a slower rate than the first bladder 102. Likewise, as the third bladder 106 begins to inflate, flow continues through the third bladder and to the second bladder 104, but is restricted by the perforations 156 in the eighth layer. The second bladder 104 therefore also begins to inflate, but at a slower rate than the first bladder and the third bladder. The collective cross-sectional areas of the perforations 126, 156 in the third layer and the eighth layer controls or determines the inflation rate of the first bladder, third bladder, and second bladders. Likewise, the cross-sectional area of the apertures in each of the first, second, and third bladders may be varied to further control the inflation and deflation rates between the bladders. When the bladders in the assembly 100 are to be deflated, the controller controls the valve 56 to a vent position, or otherwise vents the flow from the bladder assembly 100 at a point in the fluid system away from the bladder assembly 100. The bladders 102, 104, 106 rapidly deflate, generally simultaneously, as the third and eighth layers 120, 150 move from their first positions to their second positions, and act as open flap valves with pressure on the bladders in the assembly 100 as shown in FIG. 4. This allows for rapid deflation and venting of the bladders, and avoids or limits sequential deflation of the assembly or slow deflation rates.

Figure 5:
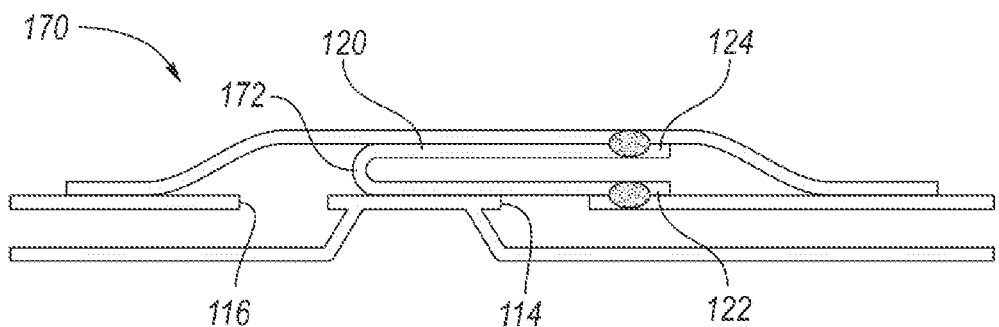
FIG. 5 illustrates a side schematic view of a bladder and valve for use with the bladder assembly of FIG. 2 according to an alternative embodiment, and with the valve in a closed position.
Figure 6:
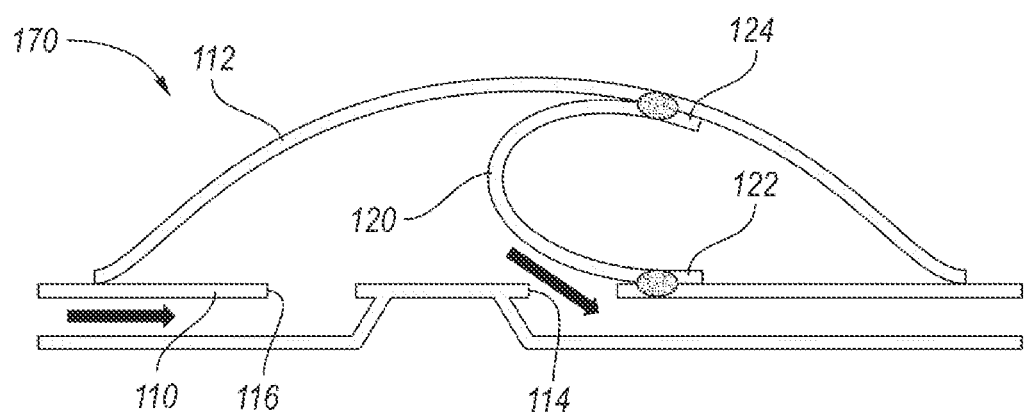
FIG. 6 illustrates a side schematic view of the bladder and valve of FIG. 5 with the valve in an open position.

FIGS. 5-6 illustrate a bladder 170 for use with the bladder assembly of FIG. 2 according to an alternative embodiment. Elements that are the same as or similar to those described above with reference to FIGS. 1-4 are given the same reference number for simplicity. Furthermore, the description of the bladder assembly and valve as provided with respect to FIGS. 1-4 may be applied to the bladder assembly and valve as shown in FIGS. 5-6 as appropriate. The bladder 170 is described below for use as the first bladder 102. In other non-limiting examples, the bladder 170 be used as the first bladder 102 or third bladder 106 as described above, or may alternatively be used in another bladder assembly or as a standalone bladder.

The bladder 170 has a first layer 110 and a second layer 112 defining a cavity. The first layer defines the first and second apertures 114, 116. The third layer 120 is positioned between the first and second layers 110, 112 and within the cavity. The third layer has the proximal end 122 connected to the first layer 110, and the distal end 124 connected to the second layer 112. The third layer 120 is movable between a first position covering the first aperture 114 as shown in FIG. 5 and preventing flow from the bladder 170 out through the aperture 114, second position spaced apart from the first aperture 114 to allow flow from the bladder 170 to flow through the aperture 114.

The layer 120 may be folded in a central region 172 between the ends 122, 124, and may unfold as the bladder 170 inflates and the second layer 112 moves away from the first layer 110. As the layer 120 is unfolded, the layer is moved away from the aperture 114, thereby allowing flow from the bladder 170 and out of the aperture 114. The layer 120 may be folded as shown, e.g. as a C-shaped or V-shaped fold, or may be folded multiple times, e.g. as a Z-shaped or other folded shape. The location of the fold 172, or of the first and second ends 122, 124 may be moved relative to the aperture 114 to control when the flap 120 moves away from the aperture 114 based on the inflation level of the bladder 170. If the layer 120 is positioned with the aperture 114 closer to the fold 172, the aperture 114 will be uncovered at a lower bladder inflation level than if the layer 120 is positioned with the aperture 114 closer to the end 122.

Note that the layer 120 acts as a flap valve such that flow can enter the bladder 170 via the aperture 114, e.g. as described above with respect to a deflation process, although in certain examples it may act to slow the deflation of an adjacent bladder.

In the example shown, the layer 120 is provided as a solid layer, or a layer without perforations described above according to various non-limiting examples. The layer 120 may therefore completely block or prevent flow across the aperture 114 in the closed position. The layer 120 may then delay filling of a bladder downstream of aperture 114 until the bladder 170 opens sufficiently to move the layer 120 away from the aperture 114.

Figure 8:
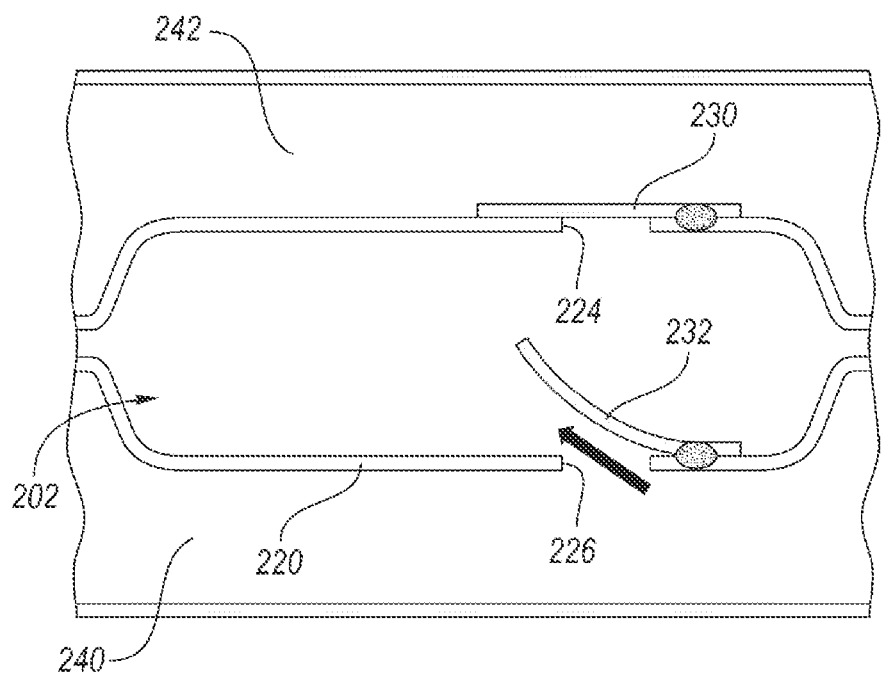
FIG. 8 illustrates a partial side schematic view of a bladder of the bladder assembly of FIG. 7.
Figure 7:
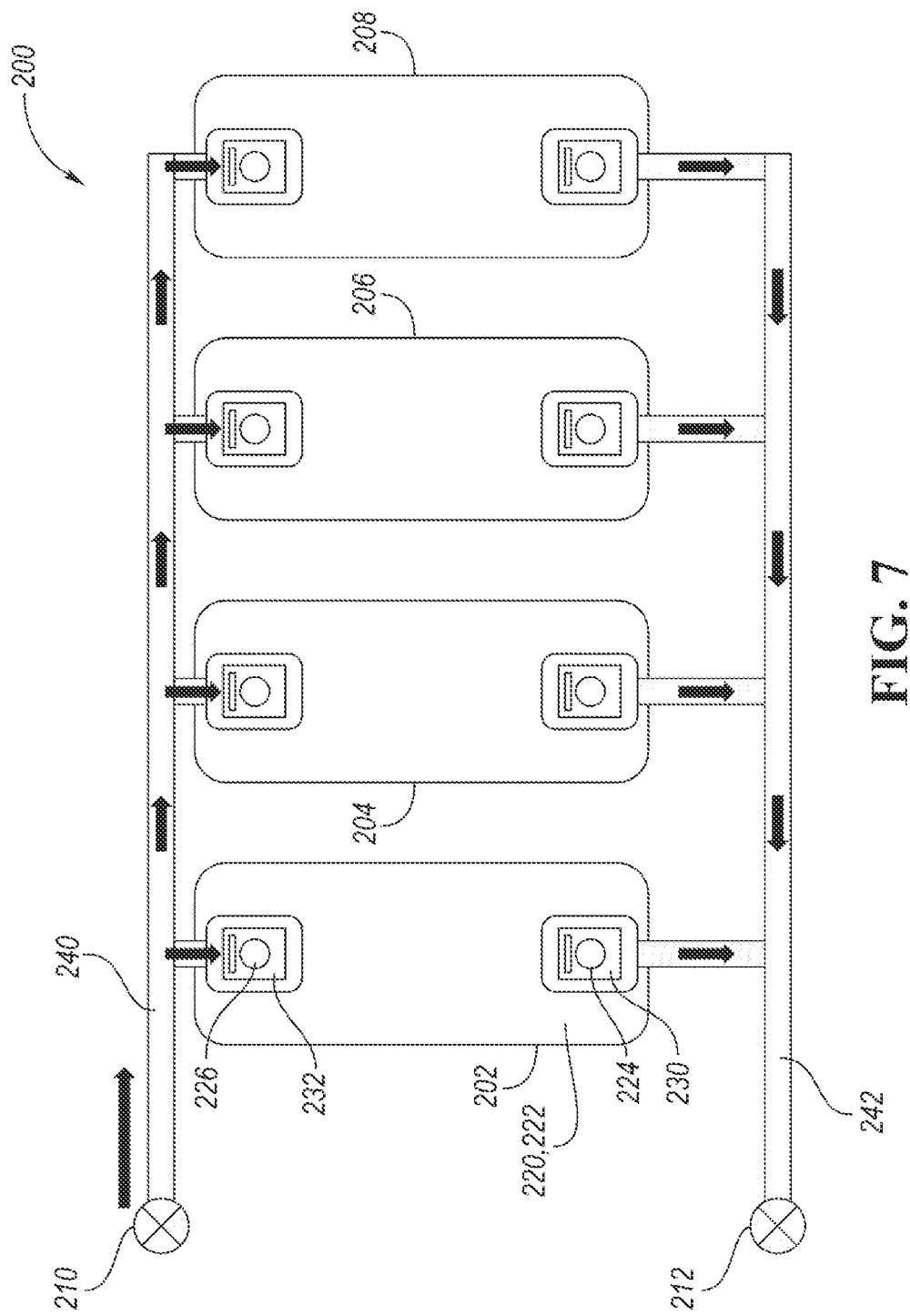
FIG. 7 illustrates a top view of a bladder assembly according to an embodiment and for use with the vehicle seat assembly of FIG. 1.

FIGS. 7-8 illustrates a bladder assembly 200 according to another embodiment. In various examples, the bladder assembly 200 may be used with the seat assembly 20 of FIG. 1, and as the bladder assembly 54 in a fluid system 50. Furthermore, the description of the bladder assembly 54, 100, 170 as provided with respect to FIGS. 1-6 may be applied to the bladder assembly 200 as shown in FIG. 7 as appropriate.

The bladder assembly 200 is shown with a first bladder 202, a second bladder 204, a third bladder 206, and a fourth bladder 208 in parallel fluid flow arrangement. In other examples, the bladder assembly 100 may be provided with one, two, or three bladders, or with more than four bladders. Furthermore, the bladders 202-208 may be arranged in other flow configurations, e.g. for a combination of sequential and parallel fluid flow, e.g. with the third bladder 206 replaced by two or more bladders in sequential arrangement with one another.

The bladder assembly 200 is fluidly connected to the fluid transfer device 52 via one or more valve assemblies 56. In one example, the bladder assembly 200 has a first valve assembly 210 and a second valve assembly 212. The first and second valve assemblies 210, 212 may each be connected to a controller 58 to control operation of the valve assemblies 210, 212. The first valve 210 may connect the bladder assembly to the fluid transfer device. The second valve 212 may vent to atmosphere according to various non-limiting examples.

The first bladder 202 has a first layer 220 connected to a second layer 222 to form a bladder and to define a cavity between the first and second layers 220, 222. The first layer 220 defines a first aperture 224 therethrough. One of the first or second layers defines a second aperture 224 therethough. In the example shown in FIG. 7, the first layer 220 also defines the second aperture 226. In the example shown in FIG. 8, the second layer 222 defines the second aperture 226. The first and second apertures 224, 226 are both in fluid communication with the cavity of the first bladder 202.

The first bladder 202 has a third layer 230 connected to the first layer 220. In the example shown, the third layer 230 is connected to the first layer 220 along a proximal end, and extends to a distal free end. The third layer may be external to the cavity such that the first layer 220 is positioned between the second layer 222 and the third layer 230.

The first bladder 202 also has a fourth layer 232 connected to the first layer 220 and positioned between the first and second layers 220, 222 within the bladder and within the cavity. In the example shown, the fourth layer 232 is connected to the first layer 220 along a proximal end, and extends to a distal free end.

The third layer 230 and the fourth layer 232 each provide a valve element for the first bladder, and may be configured as flap valves. Each of the third and fourth layers 230, 232 is movable between a first position covering the associated aperture 224, 226 to act as a closed valve element and prevent, limit, or restrict fluid flow through the aperture 224, 226, and a second position spaced apart from the associated aperture 224, 226 to act as an open valve element and permit fluid flow through the associated aperture 224, 226.

Each of the layers 230, 232 may be provided as solid sheets or layers and without perforations in various non-limiting examples.

The second bladder 204, third bladder 206, and fourth bladder 208 may each be constructed similarly to that described above with respect to bladder 202 with associated layers.

The fluid transfer device or pump provides fluid flow to the valve 210, and into the inlet passage 240 when the valve 210 is opened. Each of the bladders 202-208 is fluidly connected to the inlet passage 240 via apertures 226 such that fluid flows from the inlet passage 240 and into the bladders via the apertures 226 when the pressure in the inlet passage 240 is greater than the pressure in the bladders 202-208 with the associated layer 232 is opened via the pressure differential to allow flow into the respective bladders. Note that when the pressure in a bladder is higher than the pressure in the inlet passage 240, the layer 232 will remain closed and prevent flow across the aperture 226.

Each of the bladders 202-208 is fluidly connected to an outlet passage 242 via apertures 224 such that fluid flows from the bladders 202-208 and into the outlet passage 242 when the pressure in a bladder 202-208 is greater than the pressure in the outlet passage 242 such that the associated layer 230 is opened via the pressure differential to allow flow out of the respective bladders. Note that when the pressure in a bladder is less than the pressure in the outlet passage 242, the layer 230 will remain closed and prevent flow across the aperture 224.

Each bladder 202-208 is therefore positioned between and fluidly connecting the first valve 210 to the second valve 212, with the bladders 202-208 arranged for parallel fluid flow relative to one another.

In order to inflate the bladders 202-208, the controller opens the first valve 210 and closes the second valve 212 while operating the fluid transfer device. Fluid flows into the inlet passage 240, and into the bladders 202-208 via apertures 226, and also into the outlet passage 242 via apertures 224. The layers 230, 232 are each moved to an open position while fluid flows from the inlet passage 240, through the bladder, and into the outlet passage 242. The layers 230 move to a closed configuration when the pressure in the outlet passage is equivalent to or greater than the pressure in each bladder 202-208. The layers 232 move to a closed position when the pressure in an associated bladder is equivalent to or greater than the pressure in the inlet passage 240. Note that the layers 230, 232 move independently relative to one another and relative to the layers in adjacent bladders.

In order to deflate the bladders 202-208, the controller opens the second valve 212, and may further close the first valve 210 and/or stop the fluid transfer device. Fluid flows out of the bladders 202-208 via apertures 224, and into the outlet passage 242 and out of the valve 212 and bladder assembly 200. The layers 230 move to an open configuration when the pressure in the outlet passage is less than the pressure in each bladder 202-208, thereby allowing the bladders to vent or deflate. Note that the layers 232 may remain closed with pressure in the inlet passage 240 while the bladders are deflating, and this may provide for a reduced time for reinflation at a later cycle, as some pressure remains in the assembly 200.

In one example, the bladder assembly 200 is inflated by the pump to modify an orientation of seating surface of the seat member. In other examples, the bladder assembly 100 is inflated by the pump to provide a massage effect to a seat occupant.

The assembly 200 also limits air or fluid shifting between adjacent bladders when the assembly 200 is inflated, e.g. due to an increase of pressure on one bladder. If the pressure on one bladder increases, some fluid may leave that bladder and flow into the outlet passage 242. The increased pressure in the outlet passage 240 maintains the layers 230 for the other bladders in the closed position, such that there is no backflow from the outlet passage into the other bladders, and likewise, no backflow from any of the bladders into the inlet passage 240. If the pump is operating with valve 210 open, the bladders may further inflate or reach a higher internal pressure based on the increased pressure in the outlet passage 242. Furthermore, if there is a bladder with a lower pressure compared to the other bladders, that bladder may further inflate according to the assembly 200 as described herein.

FIG. 8 illustrates a bladder 202 during inflation or when the pressure in the outlet passage 242 is greater than the pressure in the bladder 202 such that the layer 230 is in a closed configuration, and with the pressure in the inlet passage 240 is greater than the pressure in the bladder 202 such that the layer 232 is in an open configuration.

Aspect 1. An assembly is provided with a first layer connected to a second layer to form a bladder, the first layer defining a first aperture therethrough, and one of the first or second layers defining a second aperture therethough. A third layer is connected to the first layer and positioned between the first and second layers within the bladder. The third layer is movable between a first position covering the first aperture, and a second position spaced apart from the first aperture.

Aspect 2. The assembly of any of aspects 1 or 3-7 wherein at least one of the first, second, and third layers comprise a thermoplastic.

Aspect 3. The assembly of any of aspects 1-2 or 4-7 wherein the third layer comprises one or more perforations therethough, with the one or more perforations overlapping the first aperture when the third layer is in the first position.

Aspect 4. The assembly of any of aspects 1-3 or 5-7 wherein the third layer is connected to the first layer along a proximal end, and extends to a distal free end.

Aspect 5. The assembly of any of aspects 1-2 or 6-7 wherein the third layer is connected to the first layer at a first end and is connected to the second layer at a second end opposite thereto.

Aspect 6. The assembly of any one of aspects 1-5 wherein the assembly has a fourth layer connected to one of the first or second layers, with the fourth layer movable between a first position covering the second aperture, and a second position spaced apart from the second aperture.

Aspect 7. The assembly of aspect 6 wherein the third and fourth layers cover the first and second apertures, respectively, in the first positions.

Aspect 8. An assembly is provided with a first bladder comprising a first layer connected to a second layer, and a third layer connected to the first layer. The first layer defines a first aperture therethrough. One of the first or second layers defines a second aperture therethrough. The first bladder is in fluid communication with a pump via the first aperture, and the third layer is movable from a first position covering the first aperture and a second position spaced apart from the first aperture. A second bladder comprises a fourth layer connected to a fifth layer to form a cavity, the fifth layer defining a third aperture therethrough.

Aspect 9. The assembly of any one of aspects 8 or 10-18 further comprising the pump, a valve fluidly connecting the pump to the second aperture of the first bladder, and a controller configured to control the valve between an open position and a closed position, wherein the first bladder inflates with the valve in the open position.

Aspect 10. The assembly of aspect 9 further comprising a second valve, wherein the first bladder is positioned between and fluidly connects the first valve to the second valve, and wherein the second bladder is positioned between and fluidly connects the first valve to the second valve, and is arranged for parallel fluid flow with the first bladder. The controller is configured to control the second valve between a closed position and an open position, wherein the first bladder deflates with the second valve in the closed position.

Aspect 11. The assembly of any one of aspects 8-9 and 12-17 wherein the third aperture of the second bladder is fluidly connected to the first bladder, the second bladder receiving fluid flow from the first aperture of the first bladder.

Aspect 12. The assembly of any one of aspects 8-9, 11, and 13-17 wherein the third aperture of the second bladder is the sole aperture in the second bladder.

Aspect 13. The assembly of any of one of aspects 8-9, 11-12, and 14-17 wherein the third layer of the first bladder comprises one or more perforations therethrough, the perforations positioned to overlap the first aperture of the first bladder when the third layer is in the first position.

Aspect 14. The assembly of any of one of aspects 8-9, 11-12, and 15-17 wherein the third layer of the first bladder is connected to the second layer of the first bladder.

Aspect 15. The assembly of any of one of aspects 8-9, 11-12, and 15-17 further comprising a third bladder comprising a sixth layer connected to a seventh layer, and an eighth layer connected to the sixth layer, wherein the sixth layer defines a fourth aperture, wherein the sixth or the seventh layer defines a fifth aperture therethrough, wherein the eighth layer is movable from a first position covering the fourth aperture and a second position spaced apart from the fourth aperture. The third bladder is fluidly connected to the first bladder via the first aperture of the first bladder and the fifth aperture of the third bladder. The second bladder is fluidly connected to the third bladder via the fourth aperture of the third bladder and the third aperture of the second bladder.

Aspect 16. The assembly of aspect 15 wherein the eighth layer of the third bladder defines one or more perforations therethrough, with the perforations positioned to overlap the fourth aperture of the third bladder when the third layer is in the first position.

Aspect 17. The assembly of any one of aspects 8-10 wherein the first bladder further comprises a ninth layer positioned between the first and second layers and connected to one of the first or second layers, the ninth layer moveable from a first position covering the second aperture, and a second position spaced apart from the second aperture.

Aspect 18. The assembly of aspect 17 wherein the fourth layer or the fifth layer of the second bladder defines a sixth aperture therethrough. The second bladder comprises a tenth layer positioned between the fourth and fifth layers and connected to the fourth layer of the second bladder, with the tenth layer of the second bladder movable from a first position covering the third aperture of the second bladder. The second bladder comprises an eleventh layer positioned between the fourth and fifth layers and connected to one of the fourth or fifth layers, with the eleventh layer of the second bladder movable from a first position covering the sixth aperture of the second bladder to a second position spaced apart from the sixth aperture.

Aspect 19. A seat assembly is provided with a seat member comprising a seating surface, a pump, and a bladder assembly supported by the seat member and in fluid communication with the pump to receive fluid flow therefrom. The bladder assembly comprises a first bladder comprising a first layer connected to a second layer, with the first layer defining a first aperture therethrough, and one of the first or second layers defining a second aperture therethrough, the first bladder in fluid communication with the pump via the first aperture. The first bladder further comprises a third layer connected to the one of the first or second layers, with the third layer movable from a first position covering the second aperture and a second position spaced apart from the second aperture. The bladder assembly comprises a second bladder comprising a fourth layer connected to a fifth layer, with the fourth layer defining a third aperture therethrough.

Aspect 20. The seat assembly of aspect 19 wherein the bladder assembly is inflated by the pump to modify an orientation of seating surface of the seat member.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An assembly comprising:
   a first layer connected to a second layer to form a bladder, the first layer defining a first aperture therethrough, and one of the first or second layers defining a second aperture therethough; and
   a third layer connected to the first layer and positioned between the first and second layers within the bladder;
   wherein the third layer is movable between a first position covering the first aperture, and a second position spaced apart from the first aperture.

2. The assembly of claim 1 wherein at least one of the first, second, and third layers comprise a thermoplastic.

3. The assembly of claim 1 wherein the third layer comprises one or more perforations therethough, the one or more perforations overlapping the first aperture when the third layer is in the first position.

4. The assembly of claim 1 wherein the third layer is connected to the first layer along a proximal end, and extends to a distal free end.

5. The assembly of claim 1 wherein the third layer is connected to the first layer at a first end and is connected to the second layer at a second end opposite thereto.

6. The assembly of claim 1 further comprising a fourth layer connected to one of the first or second layers, the fourth layer movable between a first position covering the second aperture, and a second position spaced apart from the second aperture.

7. The assembly of claim 6 wherein the third and fourth layers cover the first and second apertures, respectively, in the first positions.

8. An assembly comprising:
   a first bladder comprising a first layer connected to a second layer, and a third layer connected to the first layer,
   wherein the first layer defines a first aperture therethrough,
   wherein one of the first or second layers defines a second aperture therethrough,
   wherein the first bladder is in fluid communication with a pump via the first aperture, and
   wherein the third layer is movable from a first position covering the first aperture and a second position spaced apart from the first aperture; and
   a second bladder comprising a fourth layer connected to a fifth layer to form a cavity, the fifth layer defining a third aperture therethrough.

9. The assembly of claim 8, further comprising the pump;
   a first valve fluidly connecting the pump to the second aperture of the first bladder; and
   a controller configured to control the first valve between an open position and a closed position, wherein the first bladder inflates with the first valve in the open position.

10. The assembly of claim 9 further comprising a second valve;
    wherein the first bladder is positioned between and fluidly connects the first valve to the second valve;
    wherein the second bladder is positioned between and fluidly connects the first valve to the second valve, and is arranged for parallel fluid flow with the first bladder; and
    wherein the controller is configured to control the second valve between a closed position and an open position, wherein the first bladder deflates with the second valve in the closed position.

11. The assembly of claim 8 wherein the third aperture of the second bladder is fluidly connected to the first bladder, the second bladder receiving fluid flow from the first aperture of the first bladder.

12. The assembly claim 8 wherein the third aperture of the second bladder is the sole aperture in the second bladder.

13. The assembly of claim 8 wherein the third layer of the first bladder comprises one or more perforations therethrough, the perforations positioned to overlap the first aperture of the first bladder when the third layer is in the first position.

14. The assembly of claim 8 wherein the third layer of the first bladder is connected to the second layer of the first bladder.

15. The assembly of claim 8 further comprising:
    a third bladder comprising a sixth layer connected to a seventh layer, and an eighth layer connected to the sixth layer, wherein the sixth layer defines a fourth aperture, wherein the sixth or the seventh layer defines a fifth aperture therethrough, wherein the eighth layer is movable from a first position covering the fourth aperture and a second position spaced apart from the fourth aperture;
    wherein the third bladder is fluidly connected to the first bladder via the first aperture of the first bladder and the fifth aperture of the third bladder; and
    wherein the second bladder is fluidly connected to the third bladder via the fourth aperture of the third bladder and the third aperture of the second bladder.

16. The assembly of claim 15 wherein the eighth layer of the third bladder defines one or more perforations therethrough, the perforations positioned to overlap the fourth aperture of the third bladder when the third layer is in the first position.

17. The assembly of claim 8 wherein the first bladder further comprises a ninth layer positioned between the first and second layers and connected to one of the first or second layers, the ninth layer moveable from a first position covering the second aperture, and a second position spaced apart from the second aperture.

18. The assembly of claim 17 wherein the fourth layer or the fifth layer of the second bladder defines a sixth aperture therethrough;

wherein the second bladder comprises a tenth layer positioned between the fourth and fifth layers and connected to the fourth layer of the second bladder, the tenth layer of the second bladder movable from a first position covering the third aperture of the second bladder; and wherein the second bladder comprises an eleventh layer positioned between the fourth and fifth layers and connected to one of the fourth or fifth layers, the eleventh layer of the second bladder movable from a first position covering the sixth aperture of the second bladder to a second position spaced apart from the sixth aperture.

19. A seat assembly comprising:
a seat member comprising a seating surface;
a pump; and
a bladder assembly supported by the seat member and in fluid communication with the pump to receive fluid flow therefrom, the bladder assembly comprising:
a first bladder comprising a first layer connected to a second layer, the first layer defining a first aperture therethrough, one of the first or second layers defining a second aperture therethrough, the first bladder in fluid communication with the pump via the first aperture, the first bladder further comprising a third layer connected to the one of the first or second layers, the third layer movable from a first position covering the second aperture and a second position spaced apart from the second aperture, and
a second bladder comprising a fourth layer connected to a fifth layer, the fourth layer defining a third aperture therethrough.

20. The seat assembly of claim 19 wherein the bladder assembly is inflated by the pump to modify an orientation of seating surface of the seat member.

* * * * *